United States Patent
Carr et al.

(10) Patent No.: US 6,475,386 B1
(45) Date of Patent: Nov. 5, 2002

(54) FILTER FOR PURIFYING DOMESTIC DRINKING WATER

(75) Inventors: Charles Joseph Carr, Coraopolis; Richard William Farmer, Gibsonia, both of PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 0 days.

(21) Appl. No.: 09/558,558

(22) Filed: Apr. 26, 2000

(51) Int. Cl.7 .............................................. B01D 27/14
(52) U.S. Cl. ........................ 210/266; 210/282; 210/283; 210/502.1; 210/503; 210/505
(58) Field of Search .................... 210/694, 266, 210/282, 502.1, 503, 505, 507, 509, 283

(56) References Cited

U.S. PATENT DOCUMENTS

| | | | | |
|---|---|---|---|---|
| 2,278,488 A | * | 4/1942 | Ralston | 210/290 |
| 3,327,859 A | * | 6/1967 | Pall | 210/266 |
| 4,895,651 A | | 1/1990 | Niddleton | 210/266 |
| 5,021,164 A | * | 6/1991 | Gay | 210/694 |
| 5,308,482 A | | 5/1994 | Mead | 210/207 |
| 5,322,625 A | * | 6/1994 | Rise | 210/282 |
| 5,368,739 A | | 11/1994 | Dussert | 210/660 |
| 5,674,391 A | * | 10/1997 | Nohren | 210/282 |

FOREIGN PATENT DOCUMENTS

| | | |
|---|---|---|
| EP | 0 285 908 A | 10/1988 |
| EP | 0 545 503 | 6/1993 |
| FR | 2 700 324 A | 7/1994 |
| WO | WO 98 46534 A | 10/1998 |
| WO | WO 99 10076 A | 3/1999 |
| WO | WO 00 78449 A | 12/2000 |

* cited by examiner

Primary Examiner—Ivars Cintins
(74) Attorney, Agent, or Firm—Cohen & Grigsby, P.C.

(57) ABSTRACT

An improved filter is provided for lowering levels of contaminants in domestic drinking water. The filter contains an oxidized activated carbon and at least one other type of adsorbent to remove cationic species and at least one other contaminant. The filter further achieves an efficient use of the adsorbents by including an envelope containing part or all of the adsorbents, which envelope minimizes the potential for flow by-pass.

14 Claims, 3 Drawing Sheets

FILTER FOR PURIFYING DOMESTIC DRINKING WATER

FIELD OF INVENTION

The present invention relates to a filter for the removal of contaminants from domestic drinking water. In particular, the present invention relates to a gravity-flow filter containing adsorbents to remove a plurality of contaminant species from domestic drinking water.

BACKGROUND OF THE INVENTION

Complaints have been noted that domestic drinking water, in particular from household water taps, often carries a disagreeable taste or has an odor of chlorine. In addition, drinking water also may have low levels of chlorinated organics which are a result of the chlorination of the drinking water sources and, in some older homes, of lead leached from household piping systems. Many filters have been proposed or used to eliminate these objections or to remove these contaminants. Since the types of contaminants are diverse, different filtering materials, each designed to eliminate a particular objection, must be incorporated in the same filter. In a filter of limited size, a combination of filtering materials means a compromise sometimes must be adopted, leading to an inefficient removal of one or more contaminants.

The use of gravity-flow filters for domestic water purification using carafes or pitchers is well known. Typically, the carafe consists essentially of an upper chamber, a lower chamber, and a gravity-flow filter which is disposed tightly but removably between the chambers such that the filtered water is separated from the feed water. The carafe treats water in batches. Feed water is poured into the upper chamber and permeates by gravity through the gravity-flow filter. The filtered water is collected in the lower chamber.

Systems and filters that have been patented or are currently being practiced remove some but not all of the contaminants from domestic drinking water. Typically, chlorine as well as bad taste and odor are removed from the water using activated carbon. Dissolved cationic species, such as lead, are removed using ion exchange media. A gravity-flow filter cartridge also has been designed to remove biological contaminants. However, no gravity-flow filter cartridge for water pitchers or carafes has been developed to remove the dissolved organic chemicals effectively when it must also remove another type of contaminants such as cationic species.

As concern grows over the presence of trihalomethanes ("THMs") such as chloroform, in drinking water and as the drinking water regulations lower the recommended limit of THMs in drinking water, further removal of these dissolved organic chemicals at the point of use would be desirable. With the current filter designs, the combination of activated carbon and ion exchange resin will not effectively remove the dissolved organic chemicals.

Therefore, it is an object of the present invention to provide a filter that effectively removes a variety of contaminants found in domestic drinking water and overcomes many disadvantages of prior-art water filter cartridges. It is a further object of the present invention to provide a gravity-flow filter for the purification of domestic drinking water, which filter can remove cationic metal species without compromising its ability to remove dissolved organics. It is still a further object of the present invention to provide a filter having high efficiency of contaminant removal through a novel and efficient use of filtering materials. These and other objects of the present invention will become apparent upon a perusal of the present disclosure.

SUMMARY OF THE INVENTION

The present invention provides a filter comprising at least two adsorbents for reducing the levels of contaminants found in domestic drinking water. The filter efficiently removes cationic species, free chlorine and organic chemicals and substantially eliminates bad taste and odor. Adsorbents suitable for use in the present invention include, for example, oxidized activated carbon, activated carbons, zeolites, ion exchange resins, silica gel, and activated alumina. One embodiment of the present invention combines oxidized activated carbon to advantageously remove cationic species with activated carbon to adsorb organic chemicals and contaminants responsible for bad taste and odor and to react with free chlorine. Preferably, the oxidized activated carbon comprises oxidized activated carbon fibers or fabric, or activated carbon cloth ("ACC"). The filter of the present invention is designed to optimally direct water through the adsorbents to minimize potential for flow by-pass and efficiently use the adsorbents in the filter.

In one embodiment, the filter comprises a filter housing containing an elongated envelope longitudinally disposed within for retaining the adsorbents therein. The filter housing and the envelope are spaced apart from each other to define a space therebetween. Optionally, a particulate filtering means comprising, for example, filter paper is disposed in the space between the filter housing and the envelope to retain any dust which may escape from the adsorbents. The filter housing has an inlet port for feeding unheated domestic drinking water into the filter and an outlet port for discharging the filtered or treated water from the filter. The envelope may be made of any inert plastic material such as polyethylene, polypropylene, polyvinylchloride, or polytetrafluoroethylene. The envelope includes at least one means for retaining the adsorbents therein located near the inlet port the filter. An additional retaining means is preferably included near the outlet port of the filter. The retaining means may be screens, which can be of an inert plastic material or a non-corrodible metal, or perforated plates such that the adsorbents are contained and, preferably, packed tightly inside the envelope without substantially inhibiting the water flow.

In a preferred embodiment, the envelope is filled with activated carbon, that is of granular, pelletized or spherical form, and includes at least one layer of oxidized ACC, preferably near the inlet end of the filter housing. Preferably, a plurality of layers of oxidized ACC are positioned between the inlet and the activated carbon. In this way, the oxidized ACC layers receive inflow to remove cationic species before water traverses activated carbon bed in the envelope which removes dissolved organic materials, contaminants and free chlorine.

Alternatively, the oxidized activated carbon or ACC may be interspersed throughout the activated carbon bed. When the oxidized carbon is in the granular, pelletized, or spherical form it may be mixed with the activated carbon to effectively remove cationic species and organic materials. Further, use of oxidized activated carbon eliminates the need to employ an ion exchange resin and provides increased overall capacity and capability of the filter to remove organic materials. This efficiency stems from the large micropore volume which is useful for adsorption of organic materials in addition to cationic species. The filter design further promotes efficient use of adsorbents by directing the water to flow axially through the envelope and substantially eliminates flow by-pass, which is a common problem for liquid flow in filters comprising particulate materials.

Optimal flow and filtration rates can be achieved by adjusting the diameter of the envelope in relation to the diameter of the filter housing and the distance between the second retaining means of the envelope and the bottom of the filter housing. Furthermore, activated carbon also may be disposed in the space between the envelope and the filter housing to provide additional capacity for removal of contaminants. In this case, perforations may be formed into the envelope and located throughout its length. The sizes of the perforations may be selected such that they ensure a water flow throughout the adsorbent. For example, the size of the perforations may increase in the direction away from the inlet of the filter housing so that water does not preferentially flow out of the envelope through the perforations near the inlet port of the housing.

In another embodiment, the filter essentially consists of an envelope substantially as described above. The filter further has a removable connecting means at the inlet port for optionally adapting to a water source such as a sink faucet or water fountain. The connecting means may comprise any suitable means such as pipe, hose, or tube fittings. Additionally, the filter may be designed for accommodation within a standard water pitcher.

DETAILED DESCRIPTION OF THE PREFERRED EMBODIMENTS

Figure 1:
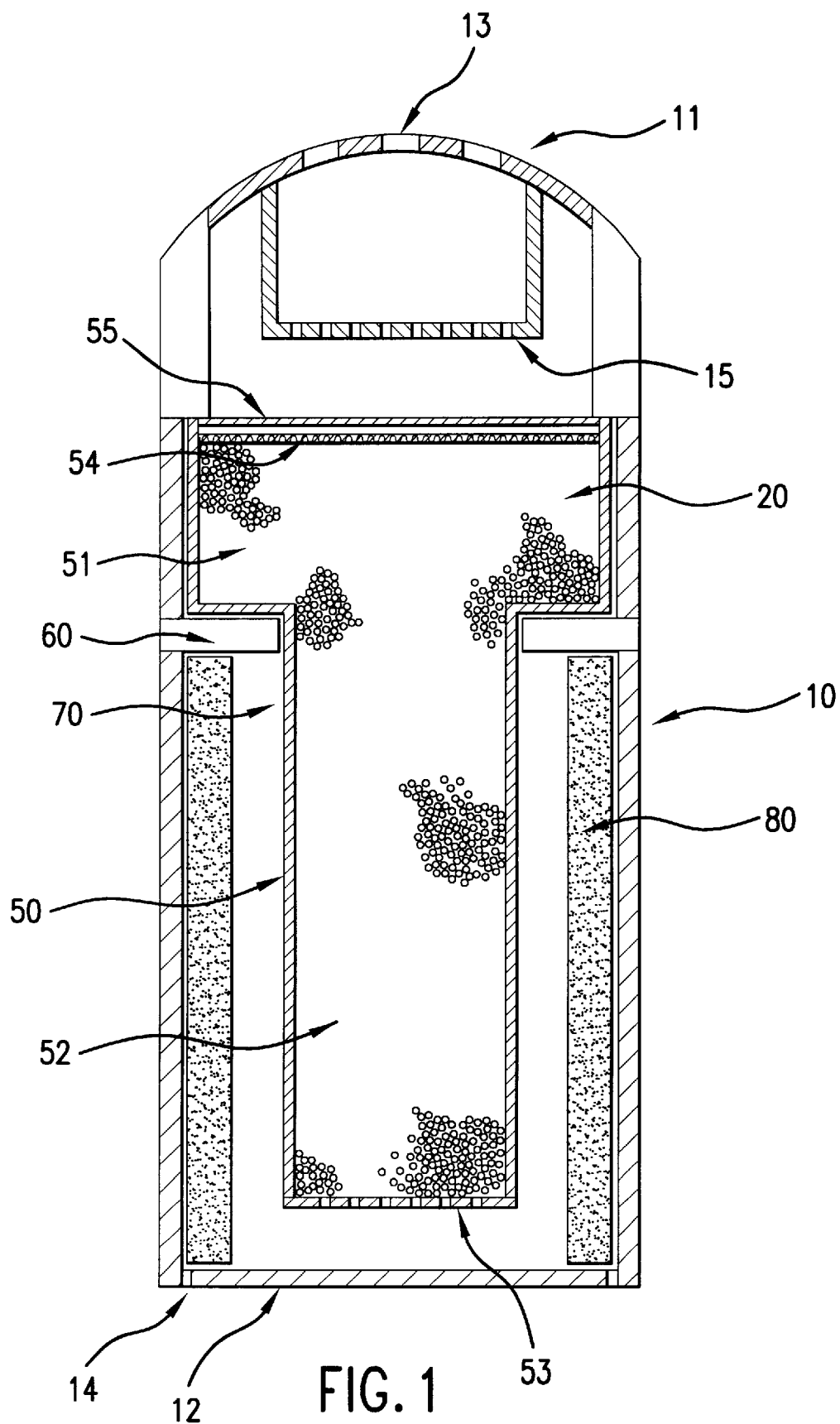
FIG. 1 is a cross-sectional view of a preferred embodiment of the filter of the present invention.

A preferred embodiment of the present invention is substantially shown in FIG. 1. The filter comprises a filter housing 10 having an inlet port 11 for inflow, an outlet port 12 for discharging filtered or treated water and an adsorbent portion 20 disposed within for retaining the adsorbents. Filter housing 10 is preferably made of a polymeric material such as high-density polyethylene, ultrahigh-density polyethylene, polypropylene, polytetrafluoroethylene, polyvinylchloride, polycarbonates or the like. In a preferred embodiment the filter housing 10 has a cylindrical shape. The inlet port 11 has a plurality of perforations 13 through which water flows into the filter and, optionally, perforated member 15 positioned beyond or below perforations 13 to further distribute water across the top of the adsorbents. Outlet port 12 has a plurality of perforations 14 disposed near the filter housing wall.

Envelope 50 comprises a top cylindrical portion 51 and a bottom cylindrical portion 52. Preferably, envelope 50 is maintained inside the filter housing 10 by a spacer 60 which is attached to the filter housing so that the bottom cylindrical portion 52 does not touch the filter outlet port 12. A retaining means 53 is attached to the lower end of the bottom cylindrical portion 52. Retaining means 53 may be formed into the envelope, comprise of an attachable screen or machined piece or by other suitable means. The top cylindrical portion 51 fits tightly inside the filter housing 10. The outside diameter of the bottom cylindrical portion 52 is smaller than the inside diameter of the filter housing 10. The envelope 50 and the filter housing 10 together define an annular space 70. A cylindrical particulate filter 80 made of fluted filter paper is disposed in the annular space 70 against the wall of the filter housing 10 for removing any carbon dust which may escape from the envelope 50.

Envelope 50 is filled with an activated carbon having a mesh size which provides an optimal adsorption rate of contaminants, such as 12×40 mesh (U.S. sieve series). The activated carbon may be in granular, pelletized or spherical form and may be made from any suitable raw material; such as processed coal, nut shell, peat, wood, or polymeric materials. For example, a thermal process for activated carbon manufacture comprises carbonization of the raw material and selective gasification of the internal porous structure of the carbonized material to produce the large adsorption pore volume of the activated carbon. A plurality of layers of oxidized ACC adsorbent 54 is disposed on top of the activated carbon proximately to the inlet port 11. An oxidized ACC adsorbent suitable for the present invention is disclosed in U.S. patent application Ser. No. 09/335,108 entitled "Carbon Char for Metals-Removal," filed Jun. 17, 1999 which is incorporated herein by reference.

Generally, an oxidized ACC suitable for inclusion in this invention has a contact pH less than about 4, more preferably less than about 3, and most preferably less than about 2.5. The contact pH of the oxidized carbon is measured by the method disclosed in U.S. patent application Ser. No. 09/335,108 entitled "Carbon Char for Metals-Removal," filed Jun. 17, 1999. The adsorbents may be secured by a retaining means 55 disposed on top of the plurality of layers of the oxidized ACC adsorbent 54. Feed water is introduced into the filter through perforations 13, distributed through perforated member 15 and retaining means 55. Cationic contaminants are substantially adsorbed by the plurality of layers of oxidized ACC adsorbent 54. Water subsequently flows through the top cylindrical portion 51 and the bottom cylindrical portion 52. Purified water emerges from the adsorbent bed through the retaining means 53 and is discharged from the filter housing through perforations 14.

In another embodiment of the present invention, activated carbon may be contained in the annular space 70 and in the space between the retaining means 53 and the bottom of the filter housing 10. Furthermore, the annular space 70 may be filled completely with activated carbon. In this case, perforations 14 may be advantageously formed into the filter housing immediately below the ring 60. In this configuration, the filter of the present invention provides an additional amount of activated carbon to lower the residual concentrations of contaminants even further or to extend the service life of the filter.

EXAMPLE 1

Filter Comprising a Combination of Activated Carbon and Oxidized ACC Adsorbent

A carafe filter housing, similar to that shown in FIG. 1, made of polyethylene was chosen for testing. The housing has a cylindrical form having a length of about 6.1 inches, an inlet port diameter of about 2.1 inches, and an outlet port diameter of about 2.0 inches. A particulate filter comprising a fluted filter paper was disposed against the interior surface of the filter housing. The filter cavity was filled with an amount of 118 ml of F600™ granular activated carbon (available from Calgon Carbon Corporation, Pittsburgh, Pa.). Three layers of oxidized FM5-250 ACC were placed between the inlet and the granular activated carbon. The oxidized FM5-250 ACC was prepared according to the process disclosed in U.S. patent application Ser. No. 09/335, 108 and had an ion exchange capacity of 1.4 meq/g of carbon as was measure by the method disclosed in the same patent application. The filter housing was sealed for water purification testing.

EXAMPLE 2

Filter of the First Preferred Embodiment

Another carafe filter housing having the same dimension as that of Example 1 included a particulate filter comprising a flute filter paper disposed against the interior surface of the filter housing and an envelope constructed of polyethylene such that the top cylindrical portion had a diameter of 2 inches and a length of 1 ⅞ inch and the bottom cylindrical portion has a diameter of ⅞ inch and a length of 3 inches. A wire mesh screen was attached to the lower end of the bottom cylindrical portion to retain the adsorbents in the envelope. The screen was about ½ inch from the bottom of the filter housing when the envelope was installed inside the filter housing. The envelope was filled with about 70 ml of F600™ granular activated carbon. Three layers of oxidized FM5-250 ACC adsorbent were placed on top of the F600™ granular activated carbon. The filled envelope was placed inside the filter housing which was subsequently resealed for testing.

WATER FOR TESTING

To provide a consistent basis for evaluating the invention, the water used for the testing was prepared according to the methods prescribed in American National Standard Institute/National Sanitation Foundation ("ANSI/NSF") Standard 53 Drinking Water Treatment Units—Health Effects (National Sanitation International, Ann Arbor, Mich.). Milli-Q (twice deionized) water was used as the base water to which were added inorganic salts of magnesium and calcium to increase the total dissolved solids, sodium bicarbonate to increase the alkalinity, and sodium hypochlorite to increase the free chlorine content of the water. Specifically, for each 20-liter batch, the following quantities of chemicals were added:

0.8 g of $MgSO_4$ (Fisher Certified Anhydrous)

1.478 g of $CaCl_2$ (Fisher Certified Anhydrous)

2.0 g of $NaHCO_3$ (Fisher Certified A.C.S.)

0.4 ml of NaOCl (Fisher Purified Grade 4–6%)

The pH of the water was then measured and adjusted to pH of 8.50±0.25 using hydrochloric acid or sodium hydroxide. Once the pH was stabilized, lead was added in the form of lead nitrate. The lead target concentration was 150 μg/L. The organic contaminant used in the evaluation of the invention was chloroform. Chloroform was chosen for the testing since this compound has been used as a surrogate for volatile organic compounds ("VOCs") in ANSI/NSF Standard 53. Once the chloroform was added, the solution was stirred overnight to allow sufficient time for the chloroform to dissolve. The chloroform target concentration was 300 μg/L.

FILTER TESTING

The carafe filters of Examples 1 and 2 and an as-received P_T® Plus carafe filter (available from Recovery Engineering, Inc. Minneapolis, Minn.), were tested for lead and chloroform removal using the above-described water. The as-received P P® Plus carafe filter had similar dimensions as the filters of Examples 1 and 2 and contained a mixture of granular activated carbon and ion exchange resin. The results obtained after 40 liters of water have been treated are as shown in Table 1.

TABLE 1

| | PP_® Plus Filter As-Received | Filter of Example 1 | Filter of Example 2 |
|---|---|---|---|
| $CHCl_3$ Removed (%) | 74.9 | 99.9 | 99.5 |
| Lead Removed (%) | 98.3 | 100 | 100 |

Therefore, replacing the ion exchange resin with oxidized ACC adsorbent enhanced the filter capability for the removal of both chloroform and lead. The filter of an embodiment of the present invention, shown in Example 2, outperformed the as-received Ppr® Plus filter even when the former contained a smaller amount of adsorbent. This advantage is a result of the more efficient use of the limited amount of adsorbent in the filter by minimizing the potential for flow by-pass.

Figure 2:
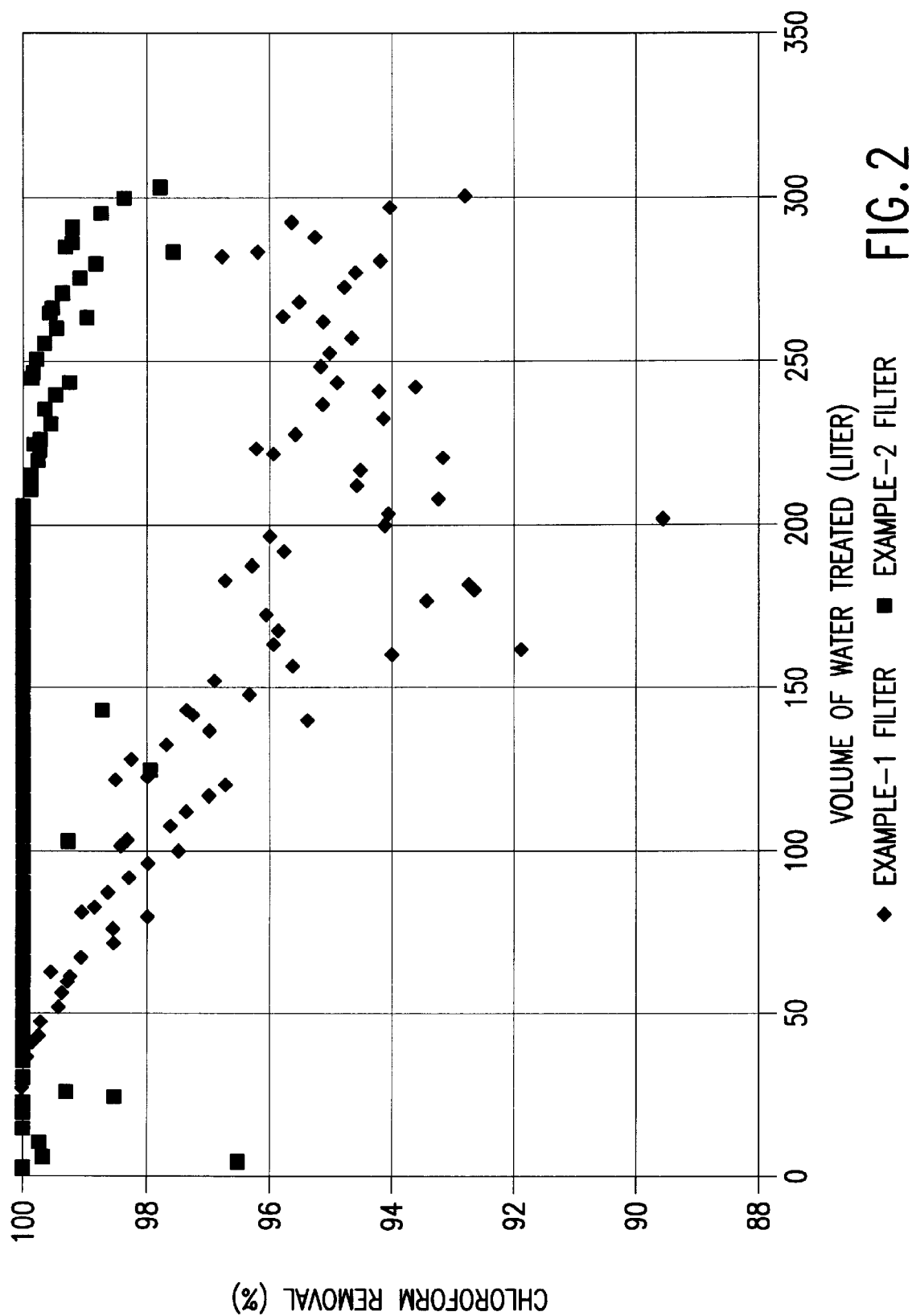
FIG. 2 shows the removal of chloroform by two filters of the present invention containing only activated carbon adsorbents.
Figure 3:
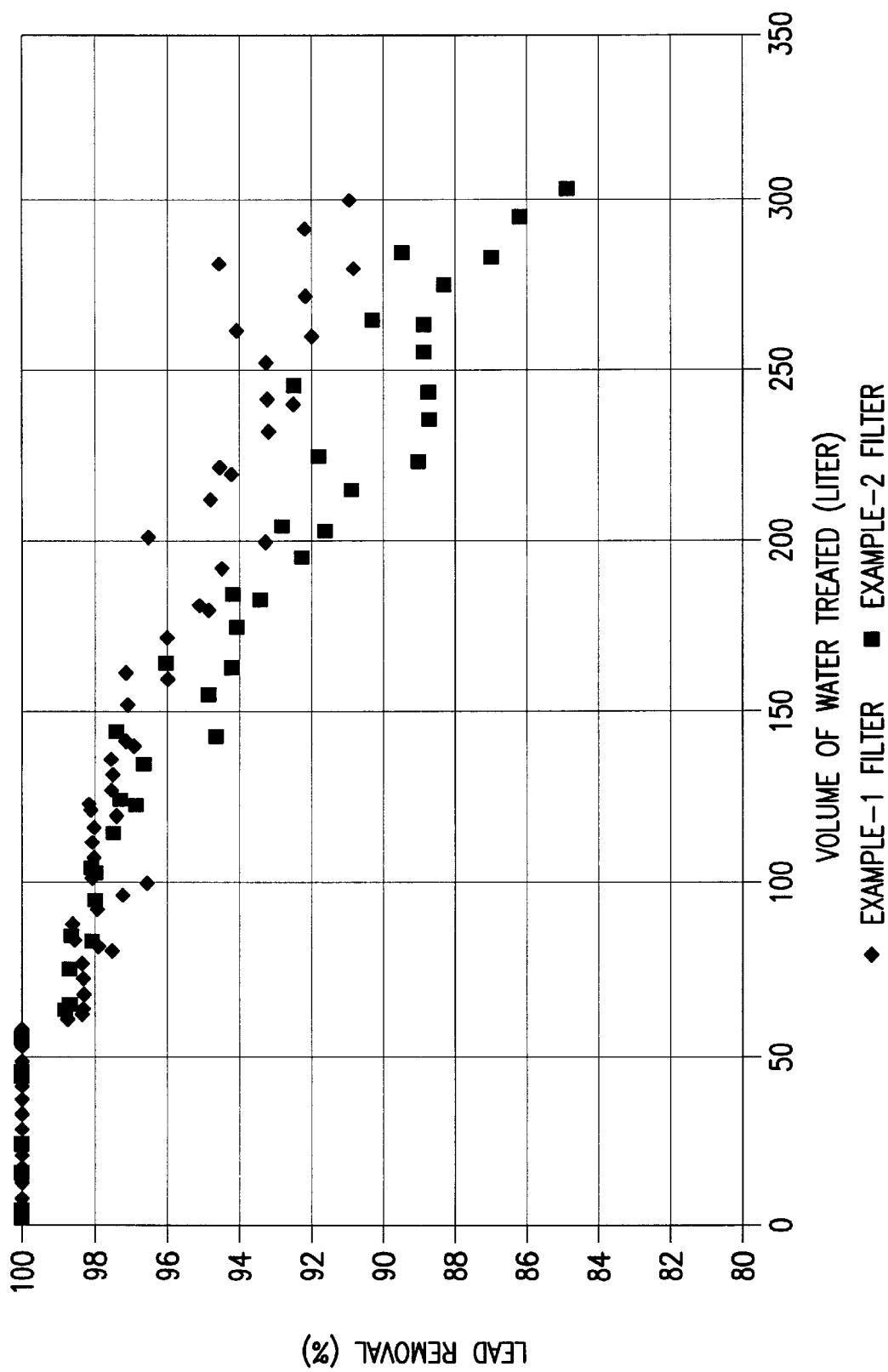
FIG. 3 shows the removal of lead by two filters of the present invention containing only activated carbon adsorbents.

The present invention shows measurable and significant improvements over a current commercial filter after 40 liters of water have been treated to remove both inorganic and organic contaminants at high efficiency. Moreover, the present invention can be used to manage and treat significant total water volume. For example, the literature for the P_T® Plus standard filter, a reference filter in this demonstration, shows a claim to treat 40 gallons (151.4 liters) of water. To measure whether the present invention will treat the same volume of water, the testing of the filters of Examples 1 and 2 of the present invention continued through 150 liters. The data in FIGS. 2 and 3 show the concentration of chloroform and lead measured in the treated water. From these figures, it can be seen that the chloroform removal at 150 liters of water treated was about 97% for the filter of Example 1 and 100% for the filter of Example 2. It is expected that the P t® Plus filter may be less. For the lead removal, the filter of Example 1 still removed about 97% of the lead while the filter of Example 2 removed about 95.5%. The slightly lower lead removal of the filter of Example 2 can be attributed to the smaller amount of granular activated carbon used in this filter because activated carbon inherently has some capacity to remove cationic species.

The advantage of the present invention is further noted by examining the data at 300 liters which show that the filters of the present invention can remove simultaneously cationic species and organic materials to a high degree. The filter of Example 1 removed about 95% of the chloroform while the filter of Example 2 still removed 98% of the chloroform. The lead removal also remained at high levels, with the filter of Example 1 at about 91% and the filter of Example filter 2 at about 86%. The overall performance of the filters of the present invention can be adjusted to meet the requirements of the target market through varying the dimensions of the envelope. The lead removal capacity of a filter of the present invention can be enhanced by including additional layers of oxidized carbon cloth.

A comparison of the filters in Examples 1 and 2 shows that containing activated carbon in the envelope improves the utilization of the organic adsorption capacity of the activated carbon. This improvement is achieved even though the amount of granular activated carbon in the filter of Example 2 is much less than the amount of granular activated carbon in the filter of Example 1. Improved axial flow, which is a result of reduced likelihood of flow by-pass, through the activated carbon bed as in the filters of the present invention results in an efficient utilization of the granular activated carbon for organic contaminant removal. Moreover, the use of the oxidized activated carbon adsorbent, which, unlike ion exchange resins, also has a large capacity for organic removal in addition to its capacity to remove cationic species, allows for a longer service life of the filter. The combined advantage therefore explains the 100% removal of lead through the first 40 liters of water treated using the filters of Examples 1 and 2 while the commercial as-received filter used here as the reference removed only 98% of the lead.

The service life of the present invention can also be extended further when activated carbon adsorbent is also contained in the space between the envelope and the filter housing. In this embodiment, the perforations for the discharging of treated or purified water are located around the circumference of the filter housing just below the spacer 60, such as a support ring. In another embodiment of the present invention, perforations are provided along the length of the envelope 50, and activated carbon is contained in the space between the envelope and the filter housing. The size of the perforations increases in the direction of the water flow through the envelope to ensure that water does not bypass the activated carbon in the envelope. This embodiment of the present invention has the advantage of the lower superficial velocity of water through the carbon bed, which promotes a sharper mass transfer zone, and the minimum flow by-pass, which promotes a more efficient use of the limited amount of carbon in the filter. Furthermore, the length of the envelope may be adjusted to provide an optimal flow rate of, and filtering time for, water through the filter. Using the envelope of the filter of Example 2, the time to filter one liter of water was 20 minutes. If the length of this envelope were increased to leave a gap of only ¼ inch from the bottom of the filter housing then the filtration time increased to 40 minutes. Further, when the diameter of the bottom cylindrical portion of the envelope was increased to 1 inch and the lower retaining means was ½ inch from the bottom of the filter housing, the filtration time for one liter of water decreased to 9 minutes. The results are summarized in Table 2.

TABLE 2

| | | | |
|---|---|---|---|
| Diameter of Bottom Cylindrical Portion of Envelope (inch) | ⅞ | ⅞ | 1 |
| Distance Between Lower Retaining Means and Bottom of Filter Housing (inch) | ½ | ¼ | ½ |
| Time to Filter One Liter of Water (minute) | 10 to 15 | 25 to 30 | 7 to 9 |

While the foregoing has described the preferred embodiments and modes of operations of the present invention, it should be appreciated that numerous variations, changes, and equivalents may be made to these embodiments and modes of operation without departing from the scope of the present invention as defined in the following claims.

What is claimed is:

1. A gravity-flow filter for lowering levels of contaminants in drinking water comprising a housing for filtering water having an inlet port and an outlet port, said housing containing between said inlet port and outlet port an oxidized activated carbon cloth or fabric and at least one other adsorbent selected from the group consisting of activated carbon, zeolite, ion exchange resin, silica gel, and activated alumina.

2. A gravity-flow filter for lowering levels of contaminants in drinking water comprising:
   (a) a filter housing having an inlet port and an outlet port; and
   (b) an elongated envelope being disposed within said filter housing and spaced apart therefrom to define a space therebetween, said envelope including at least one retainer means, said envelope containing an oxidized activated carbon cloth or fabric and at least one other adsorbent selected from the group consisting of activated carbon, zeolite, ion exchange resin, silica gel, and activated alumina.

3. A gravity-flow filter for lowering levels of contaminants in drinking water as recited in claim 2 wherein said elongated envelope extends proximately from said inlet port of said filter housing to said outlet port of said filter housing.

4. A gravity-flow filter for lowering levels of contaminants in drinking water as recited in claim 3 wherein said inlet port and outlet port comprise a plurality of perforations.

5. A gravity-flow filter for lowering levels of contaminants in drinking water as recited in claim 1 or 2 wherein said at least one other adsorbent is activated carbon.

6. A gravity-flow filter for lowering levels of contaminants in drinking water as recited in claim 1 or 2 wherein said oxidized activated carbon is disposed as a separate layer on said at least one other adsorbent.

7. A gravity-flow filter for lowering levels of contaminants in drinking water as recited in claim 1 or 2 wherein said oxidized activated carbon is interspersed in said at least one other adsorbent.

8. A gravity-flow filter for lowering levels of contaminants in drinking water as recited in claim 1 or 2 further including a particulate filtering means being disposed against an interior surface of said filter housing.

9. A gravity-flow filter for lowering levels of contaminants in drinking water as recited in claim 1 or 2 wherein said oxidized activated carbon has a contact pH less than about 4.

10. A gravity-flow filter for lowering levels of contaminants in drinking water as recited in claim 1 or 2 further including a removable connecting means at the inlet port for optionally adapting to a water source.

11. A gravity-flow filter for lowering levels of contaminants in drinking water as recited in claim 2 wherein said space between said envelope and said filter housing is occupied by an adsorbent selected from the group consisting of activated carbon, zeolite, ion exchange resin, silica gel, and activated alumina.

12. A gravity-flow filter for lowering levels of contaminants in drinking water as recited in claim 11 wherein said envelope includes a plurality of perforations along a length of said envelope, said perforations having a size increasing in a direction away from said inlet port of said filter housing.

13. A gravity-flow filter for lowering levels of contaminants in drinking water comprising:
   (a) a filter housing having an inlet port and an outlet port; and
   (b) an elongated envelope being disposed within said filter housing and spaced apart therefrom to define a space therebetween, said envelope including at least one retainer means, said envelope containing an oxidized activated carbon and at least one other adsorbent selected from the group consisting of activated carbon, zeolite, ion exchange resin, silica gel, and activated alumina, wherein said space between said envelope and said filter housing is occupied by an adsorbent selected from the group consisting of activated carbon, zeolite, ion exchange resin, silica gel, and activated alumina.

14. A gravity-flow filter for lowering levels of contaminants in drinking water as recited in claim 13 wherein said envelope includes a plurality of perforations along a length of said envelope, said perforations having a size increasing in a direction away from said inlet port of said filter housing.

* * * * *